United States Patent [19]
Nishioka

[11] Patent Number: 6,089,891
[45] Date of Patent: Jul. 18, 2000

[54] IC CARD CONNECTOR DEVICE

[75] Inventor: Toru Nishioka, Miyagi-ken, Japan

[73] Assignee: Alps Electric Co., Ltd., Tokyo, Japan

[21] Appl. No.: 09/243,728

[22] Filed: Feb. 3, 1999

[30] Foreign Application Priority Data

Feb. 5, 1998 [JP] Japan .................................. 10-024374

[51] Int. Cl.[7] .................................................. H01R 13/62
[52] U.S. Cl. ............................................................ 439/159
[58] Field of Search ..................................... 439/159, 152, 439/155, 541.5

[56] References Cited

U.S. PATENT DOCUMENTS

| | | |
|---|---|---|
| 5,499,925 | 3/1996 | Lwee . |
| 5,536,180 | 7/1996 | Ishida et al. ............................. 439/159 |
| 5,575,669 | 11/1996 | Lin et al. . |
| 5,599,197 | 2/1997 | Ishida et al. ............................. 439/159 |
| 5,655,918 | 8/1997 | Soh ........................................ 439/159 |
| 5,683,258 | 11/1997 | Takano et al. ........................... 439/159 |
| 5,846,096 | 12/1998 | Ishida ..................................... 439/159 |
| 5,871,365 | 2/1999 | Kajiura ................................... 439/159 |
| 5,906,510 | 5/1999 | Lwee ...................................... 439/159 |

FOREIGN PATENT DOCUMENTS 6-13072  2/1994  Japan .

*Primary Examiner*—Khiem Nguyen
*Assistant Examiner*—Brian S. Webb
*Attorney, Agent, or Firm*—Brinks, Hofer, Gilson & Lione

[57] ABSTRACT

An IC card connector device solves a problem with a conventional IC card connector device using two IC cards, the problem being such that two push rods are vertically disposed, leading to higher cost due to more parts incorporated, poor assemblability, and an increased height of the connector device. To eject a first IC card, which has been inserted, a single push rod set in an extended position is pushed to eject the first IC card via a single transmitting pin. To eject a second IC card, a handle is circularly moved with the push rod in the extended position so as to move the transmitting pin from a first heart-shaped cam cutout to a second heart-shaped cam cutout. In this state, the push rod is pressed toward a pushed-in position, which causes the single transmitting pin to circularly move to eject the second IC card. Therefore, the connector device employs only the single push rod and the single transmitting pin, making it possible to provide a smaller connector device that features fewer parts, lower cost, and better assemblability.

8 Claims, 16 Drawing Sheets

IC CARD CONNECTOR DEVICE

BACKGROUND OF THE INVENTION

1. Field of the Invention

The present invention relates to an IC card connector device installed in equipment that employs an IC card inserted therein or removed therefrom.

2. Description of the Related Art

A connector device for an IC card is usually constituted primarily by a pin header composed of multiple pin contacts, which are disposed in a pin housing, for the connection to a socket contacts in an IC card, a frame for protecting the IC card at the time of removing or inserting the IC card, and an ejection mechanism for ejecting an inserted IC card from the pin housing. A connector device for an IC card which has a housing and a frame integrally molded is also known.

In an IC card connector device disclosed in Japanese Unexamined Utility Model Publication No. 6-13072, two IC cards are disposed at top and bottom of a guide of a frame such that they may be separately inserted or removed by two push rods provided at the top and bottom. Two ejection mechanisms which are respectively coupled to the two push rods are disposed at the top and bottom of the frame. The connector device further includes first and second transmitting levers which link the push rods and slide plates, a third transmitting lever which is rotatably supported by the first transmitting lever and which is removably engaged with the second transmitting lever, and a heart-shaped cam mechanism which is able to hold the push rods in a pushed-in position and a first extended position. The pushing force of the push rods can be selectively transmitted to the slide plates according to the extending amount of the push rods.

When the IC cards are in an inserted position, the push rods are held in the pushed-in position. The third transmitting lever is not in engagement with the second transmitting lever; however, when the push rods are extended to a first extended position by the heart-shaped cam mechanism and further drawn to the front until they reach a second extended position, the third transmitting lever engages with the second transmitting lever in the second extended position. In this state, pressing the push rods in the pushed-in direction causes the pushing force to be transmitted to the slide plates via the respective transmitting levers, causing the slide plates to push out the IC cards to the front to eject the IC cards.

The top and bottom IC cards are respectively ejected by operating the two push rods separately as set forth above.

Thus, according to the IC card connector device disclosed in the publication mentioned above, when the IC card connector device accommodates two IC cards, it incorporates two push rods disposed at top and bottom. This configuration poses problems of more components, higher cost, deteriorated assemblability, and an increased height of a completed connector device.

Further, three transmitting levers are provided in linkage between the push rods and the slide plates, and the pushing forces of the push rods are transmitted or not transmitted to the slide plates according to the positions of the transmitting levers. This also poses a problem in that a larger space is required for the respective transmitting levers to swing, making it difficult to reduce the size of a completed IC card connector device.

SUMMARY OF THE INVENTION

Accordingly, it is an object of the present invention to provide a connector device for an IC card that solves the problems with the conventional art described above.

According to one aspect of the invention, there is provided an IC card connector device having: a frame which supports two IC cards, namely, first and second IC cards, in such a manner that they may be inserted therein and removed therefrom; a single push rod which is able to reciprocate between a pushed-in position and an extended position; a single transmitting pin rotatably attached to the push rod; and a handle rotatably attached to the push rod; wherein, when the first or/and second IC cards are inserted, the push rod is placed in the pushed-in position by a locking mechanism of the transmitting pin, and a first push on the push rod in the condition releases the locking mechanism of the transmitting pin, causing the push rod to move to an extended position where a second push on the push rod causes the first IC card to be ejected by the transmitting pin; and wherein the transmitting pin is circularly moved by circularly moving the handle when the push rod is in the extended position, then the transmitting pin is circularly moved by pushing the push rod thereby to eject the second IC card.

In a preferred form of the invention, the locking mechanism is formed of two, namely, first and second, heart-shaped cam cutouts arranged side by side; the single transmitting pin is circularly moved to trace the first and second heart-shaped cam cutouts; two, namely, first and second, driving plates which are removably engaged with the transmitting pin and are able to reciprocate are provided; so that when the push rod placed in the extended position is pushed, the transmitting pin, which is in a state where it can be engaged with the first driving plate, traces the first heart-shaped cam cutout so as to move the first driving plate by the transmitting pin thereby to eject the IC card via the first driving plate, and when the push rod is in the extended position, the transmitting pin is moved from the first heart-shaped cam cutout to the second heart-shaped cam cutout by circularly moving the handle, then the push rod is pushed to cause the transmitting pin, which is in a state where it can be engaged with the second driving plate, to trace the second heart-shaped cam cutout so as to move the transmitting pin and the second driving plate to eject the second IC card via the second driving plate.

In another preferred form of the invention, the first and second heart-shaped cam cutouts arranged side by side are configured to share a part of a cam cutout adjacent to the first and second heart-shaped cam cutouts.

A further preferred form of the invention is designed so that: when the push rod is in the pushed-in position, the transmitting pin is in a state where it is locked in the first heart-shaped cam cutout and disengaged from the first driving plate; when the push rod in the pushed-in position is pressed, the transmitting pin moves in unison with the push rod and traces the first heart-shaped cam cutout until the transmitting pin becomes engageable with the first driving plate and the extended position is reached; in the extended position, when the transmitting pin is moved from the first heart-shaped cam cutout to the second heart-shaped cam cutout by circularly moving the handle, the transmitting pin becomes engageable with the second driving plate; under this condition, when the push rod is pushed, the transmitting pin traces the second heart-shaped cam cutout, causing the transmitting pin to be locked in the second heart-shaped cam cutout and the push rod to be placed in the pushed-in position; and when the push rod is pressed in the pushed-in position, the transmitting pin moves in unison with the push rod and traces the second heart-shaped cam cutout so that the transmitting pin becomes engageable with the first driving plate and the extended position is reached.

In a further preferred form of the invention, a spring member for resetting the handle to its original condition after the handle is circularly moved.

In a further preferred form of the invention, the spring member is provided integrally with the handle and a part of the spring member is abutted against the push rod.

In a further preferred form of the invention, the transmitting pin is composed of a U-shaped member having a top segment portion and bent segment portions formed on both ends of the top segment portion, the push rod is provided with a protuberance against which the top segment portion of the transmitting pin is abutted, one bent segment portion of the transmitting pin is engaged with the heart-shaped cam cutouts, and the top segment portion of the transmitting pin is elastically pressed between one bent segment portion of the transmitting pin and the protuberance by an elastic member.

In a further preferred form of the invention, the U-shaped transmitting pin is formed such that the bent segment portions on both ends of the top segment portion have the same length.

In a further preferred form of the invention, when the handle is circularly moved, the transmitting pin is moved from the first heart-shaped cam cutout to the second heart-shaped cam cutout via the elastic member.

DESCRIPTION OF THE PREFERRED EMBODIMENT

Figure 1:
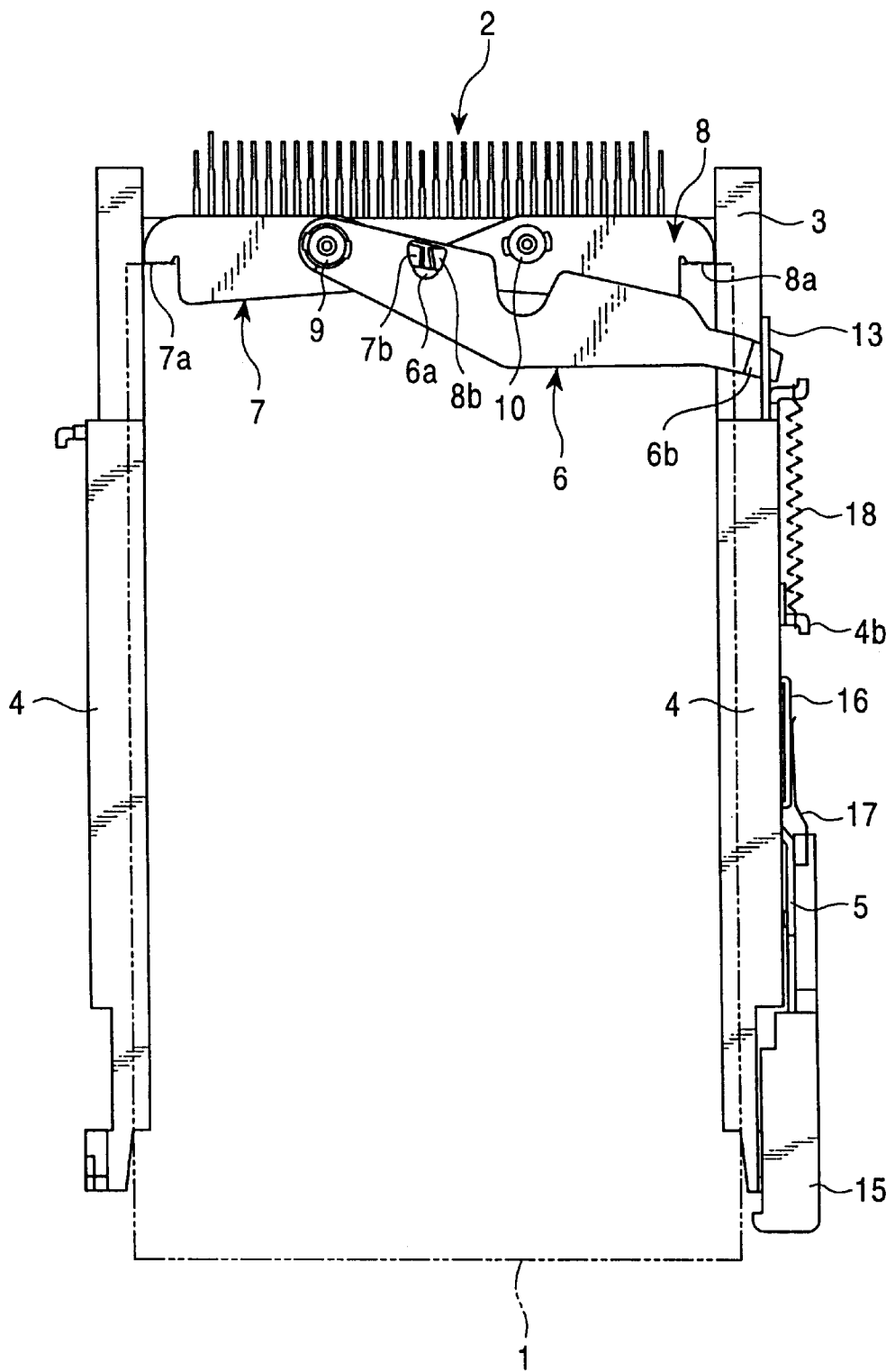
FIG. 1 is a top plan view of an IC card connector device in accordance with the invention in a state where an IC card has been inserted therein.
Figure 2:
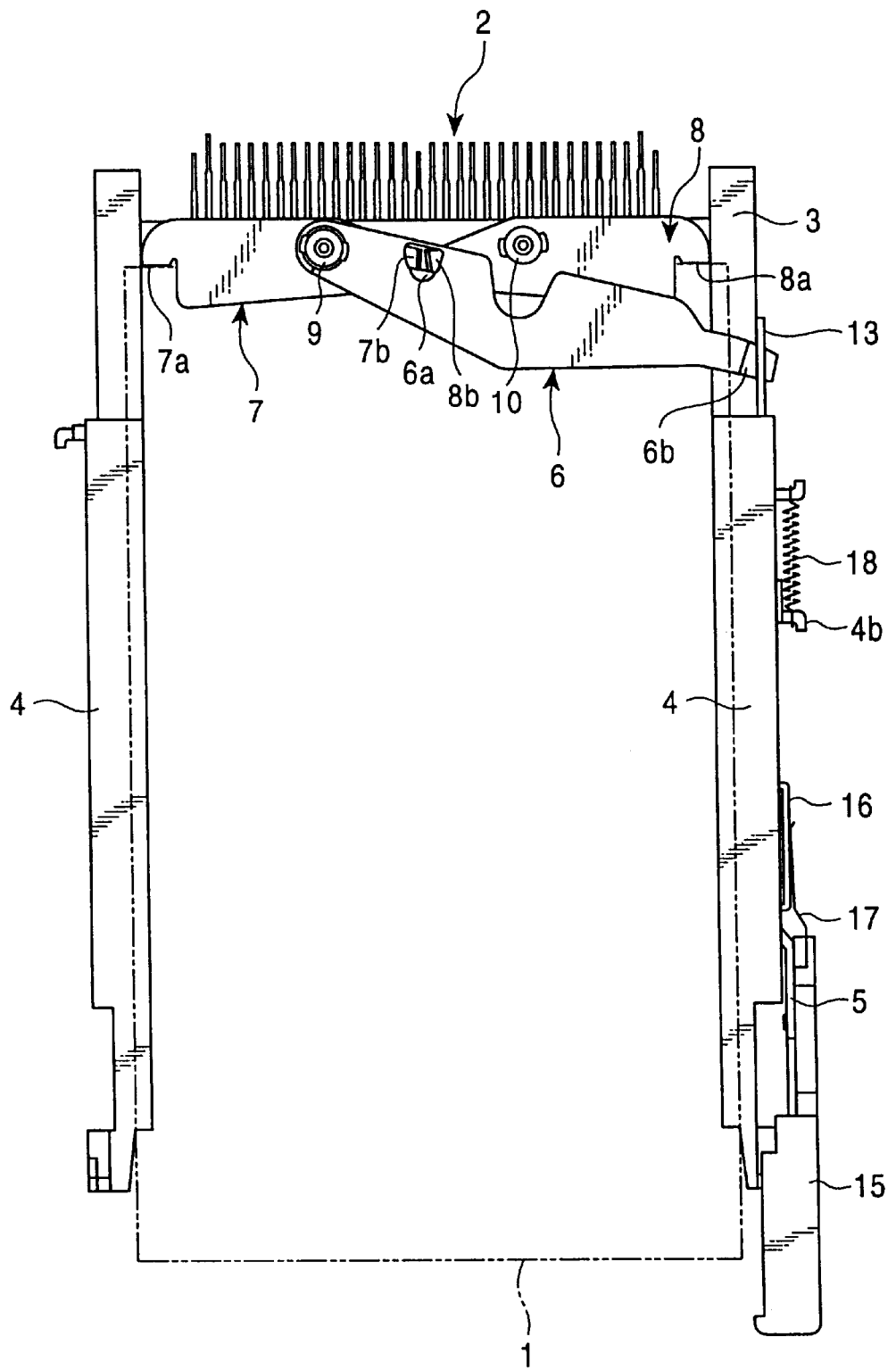
FIG. 2 is a top plan view of the IC card connector device in accordance with the invention in a state wherein the IC card has been inserted therein and a push rod is in an extended position.
Figure 3:
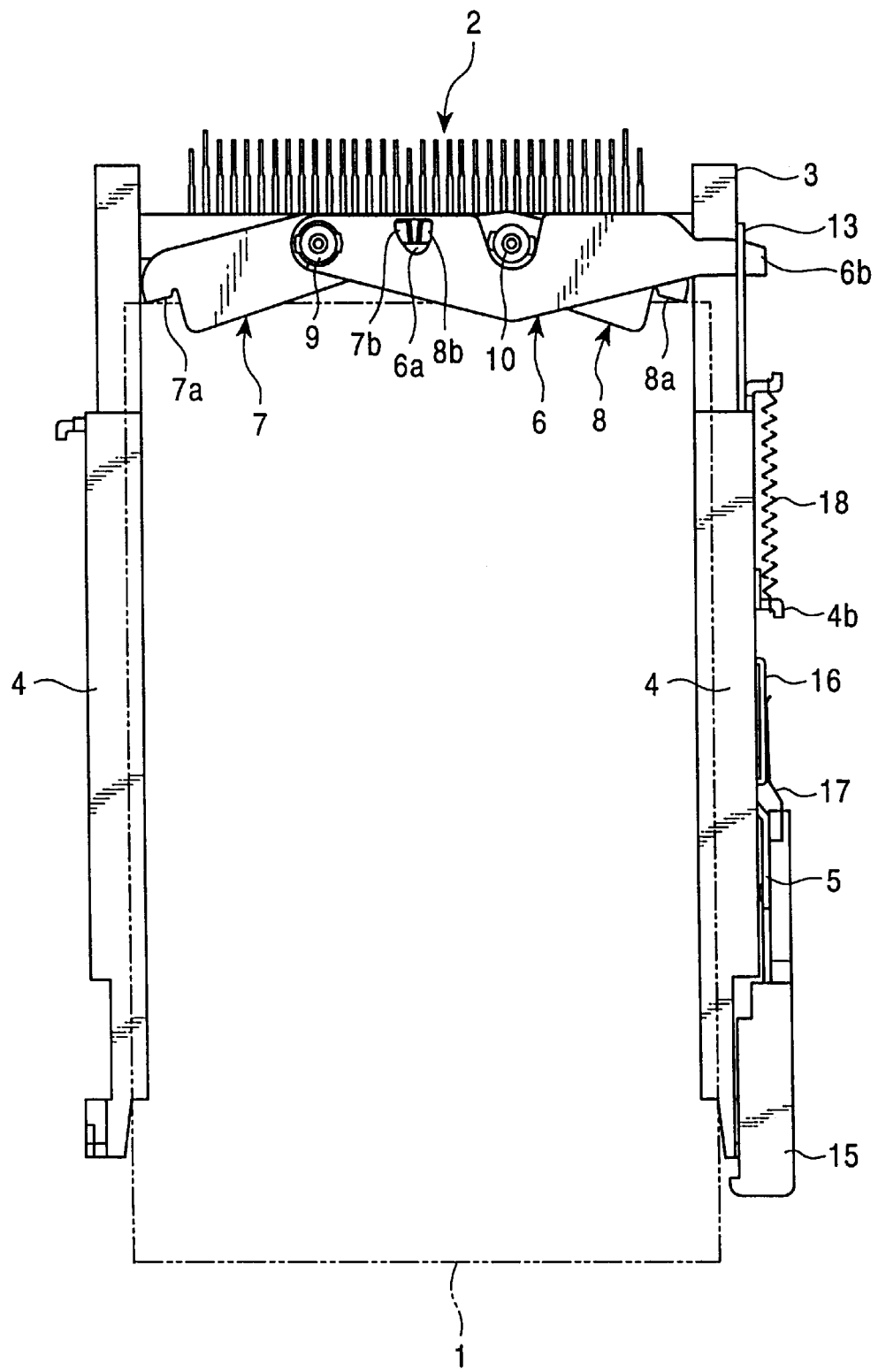
FIG. 3 is a top plan view of the IC card connector device in accordance with the invention in a state immediately after the IC card has been ejected therefrom.
Figure 4:
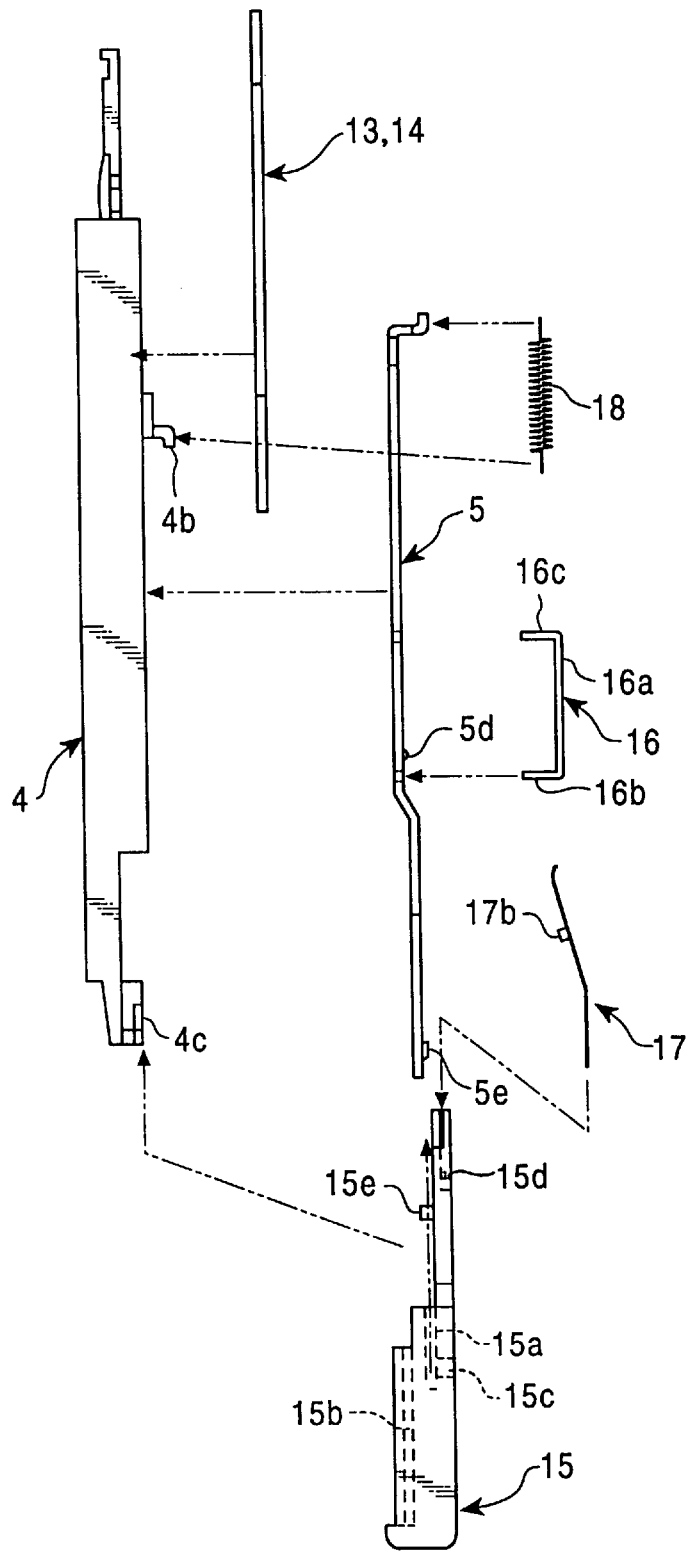
FIG. 4 is an exploded view of an essential section of an ejection mechanism of the IC card connector device in accordance with the invention.
Figure 5A:
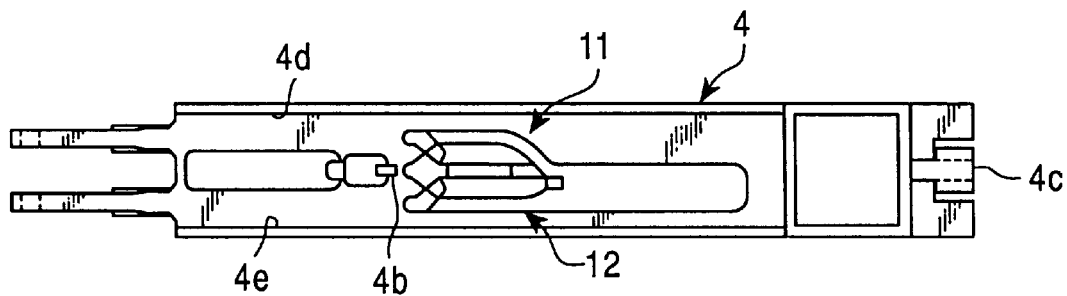
FIG. 5A shows a top plan view of a frame of the IC card connector device in accordance with the invention.
Figure 5B:
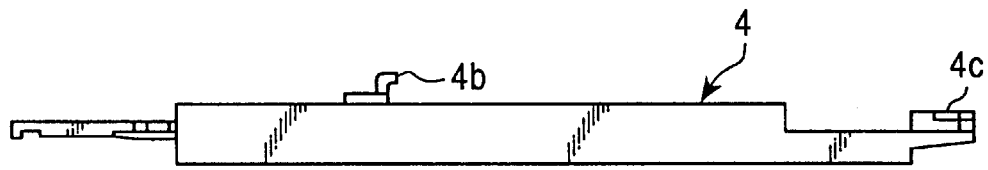
FIG. 5B shows a front view of the frame of the IC card connector device in accordance with the invention.
Figure 5C:
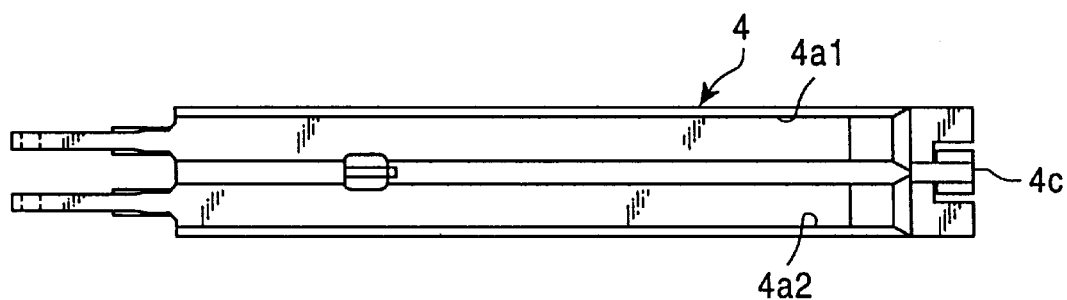
FIG. 5C shows a bottom view of the frame of the IC card connector device in accordance with the invention.
Figure 5D:
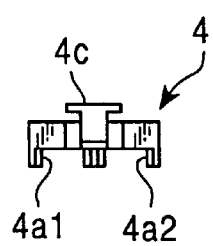
FIG. 5D shows a right side view of the frame of the IC card connector device in accordance with the invention.
Figure 6A:
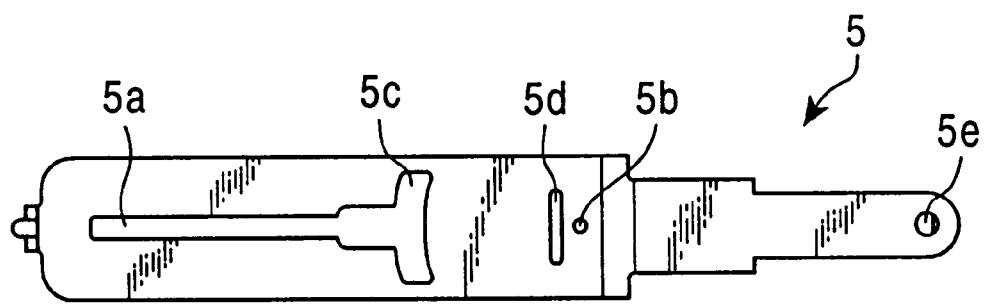
FIG. 6A shows a top plan view of a push rod of the IC card connector device in accordance with the invention.
Figure 6B:
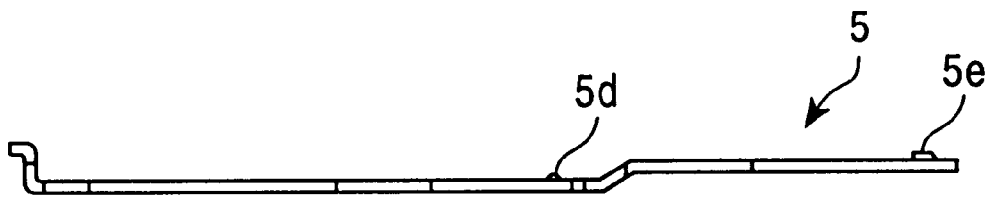
FIG. 6B shows a front view of the push rod of the IC card connector device in accordance with the invention.
Figure 7A:
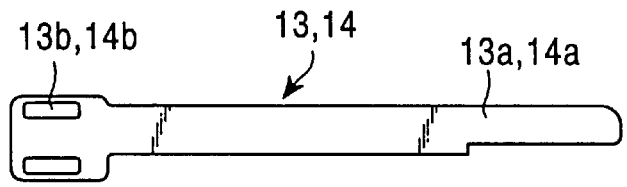
FIG. 7A shows a top plan view of a driving plate of the IC card connector device in accordance with the invention.
Figure 7B:
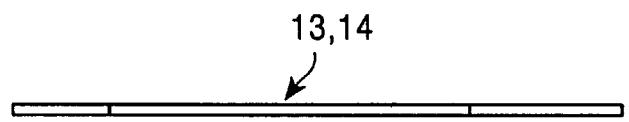
FIG. 7B shows a front view of the driving plate of the IC card connector device in accordance with the invention.
Figure 8A:
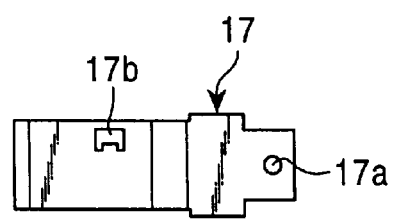
FIG. 8A shows a top plan view of an elastic member of the IC card connector device in accordance with the invention.
Figure 8B:
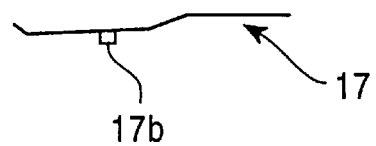
FIG. 8B shows a front view of the elastic member of the IC card connector device in accordance with the invention.
Figure 9A:
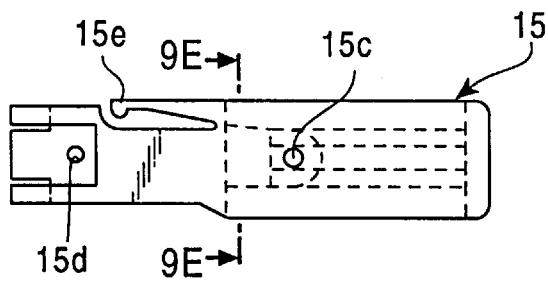
FIG. 9A shows a top plan view of a handle of the IC card connector device in accordance with the invention.
Figure 9B:
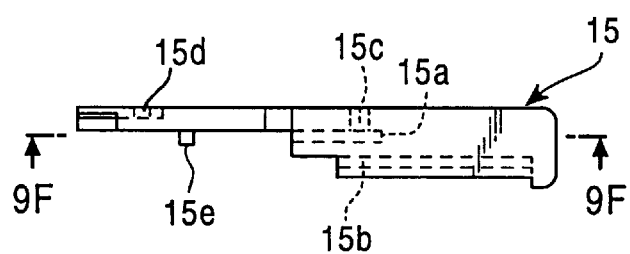
FIG. 9B shows a front view of the handle of the IC card connector device in accordance with the invention.
Figure 9C:
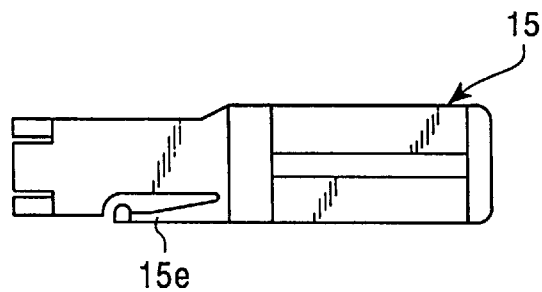
FIG. 9C shows a bottom view of the handle of the IC card connector device in accordance with the invention.
Figure 9D:
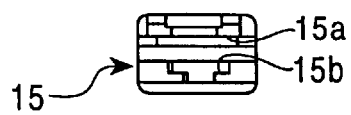
FIG. 9D shows a left side view of the handle of the IC card connector device in accordance with the invention.
Figure 9E:
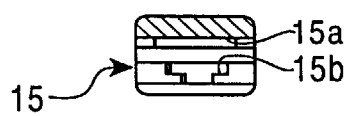
FIG. 9E shows a sectional view of the handle of the IC card connector device in accordance with the invention taken at the line 9E—9E of FIG. 9A.
Figure 9F:
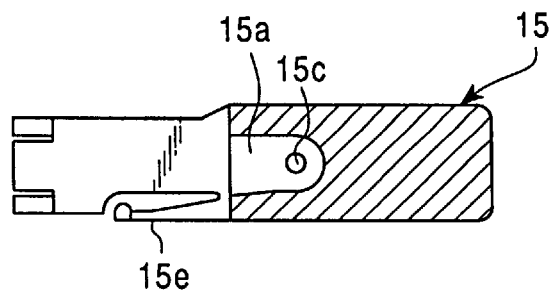
FIG. 9F shows a sectional view of the handle of the IC card connector device in accordance with the invention taken at the line 9F—9F of FIG. 9B.
Figure 10:
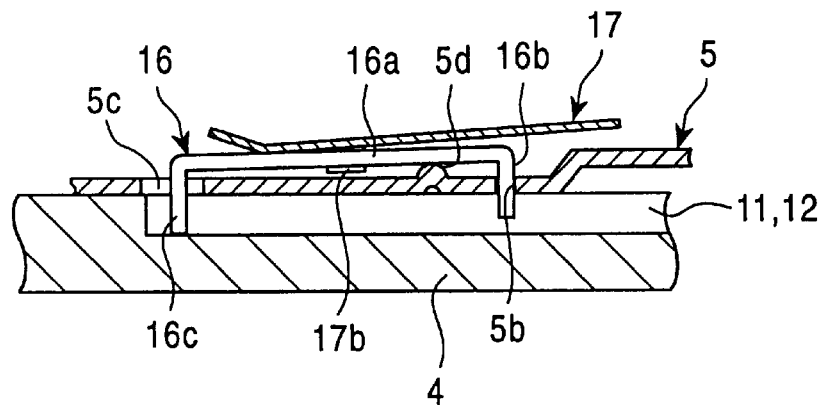
FIG. 10 is a sectional view showing an essential section of an ejection mechanism of the IC card connector device in accordance with the invention.
Figure 11A:
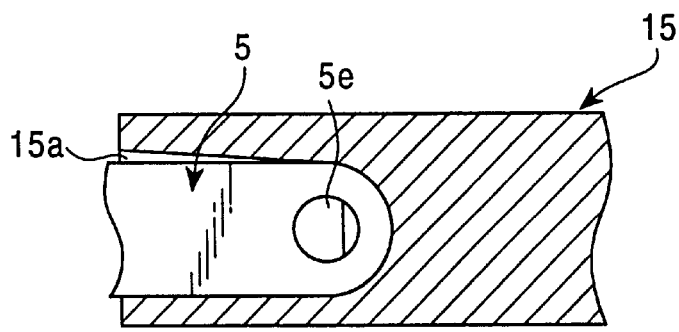
FIG. 11A shows an enlarged sectional top plan view of the push rod, the frame, and the handle in the IC card connector device in accordance with the invention.
Figure 11B:
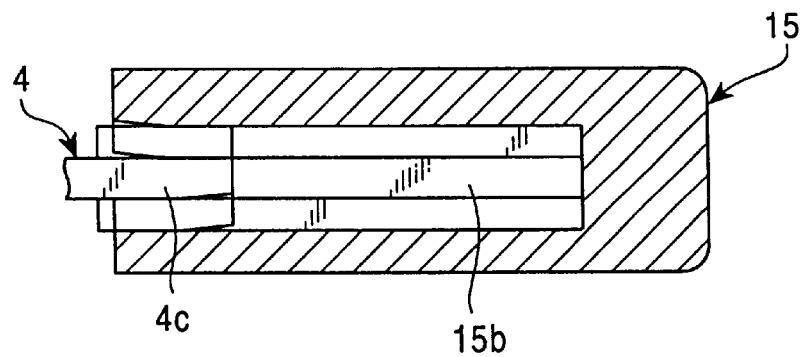
FIG. 11B shows an enlarged sectional front view of the push rod, the frame, and the handle in the IC card connector device in accordance with the invention.
Figure 12A:
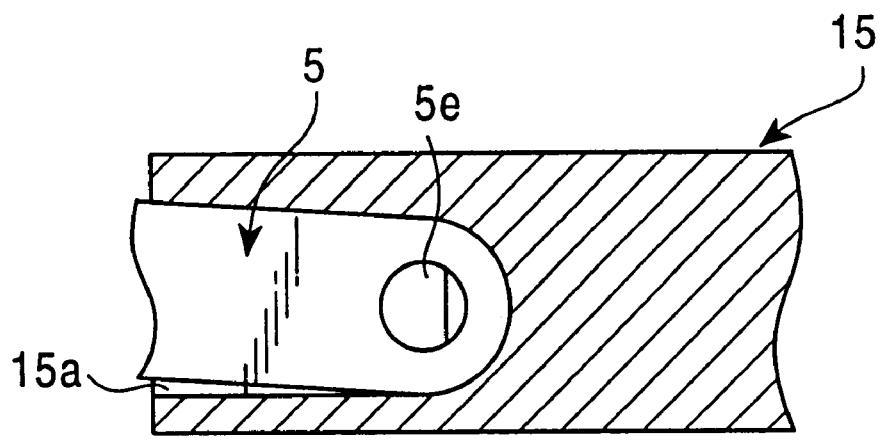
FIG. 12A shows an enlarged sectional top plan view of the push rod, the frame, and the handle in operation in the IC card connector device in accordance with the invention.
Figure 12B:
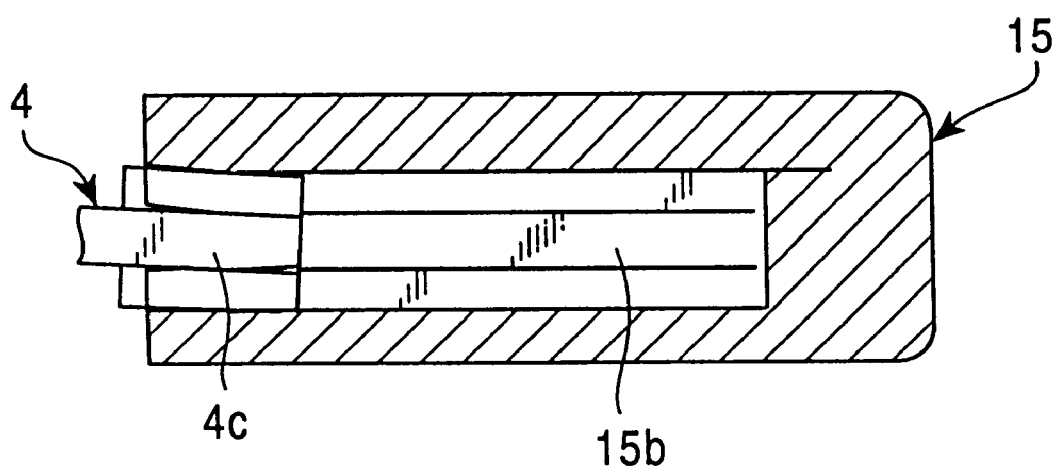
FIG. 12B shows an enlarged sectional front view of the push rod, the frame, and the handle in operation in the IC card connector device in accordance with the invention.
Figure 13A:
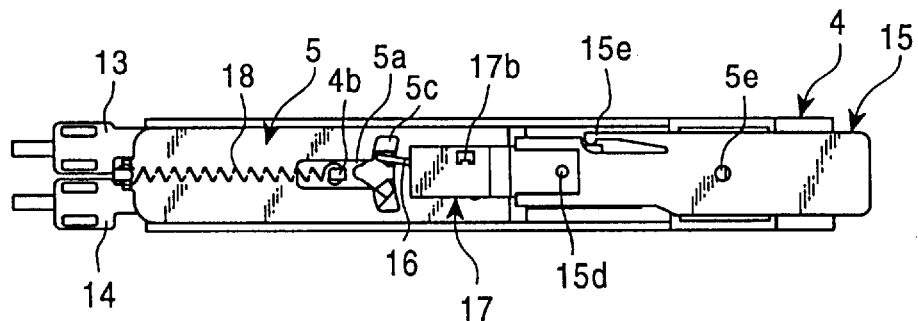
FIG. 13A shows a top plan view of the push rod in a pushed-in position in the IC card connector device in accordance with the invention.
Figure 13B:
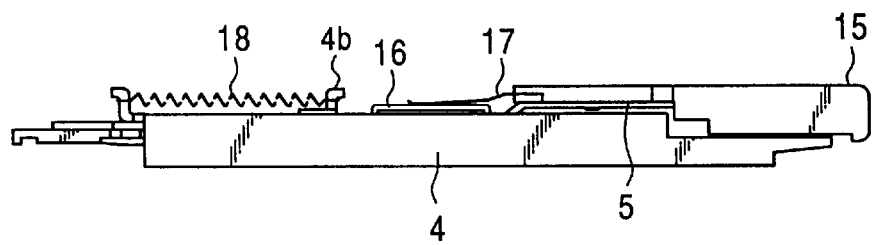
FIG. 13B shows a front view of the push rod in the pushed-in position in the IC card connector device in accordance with the invention.
Figure 14A:
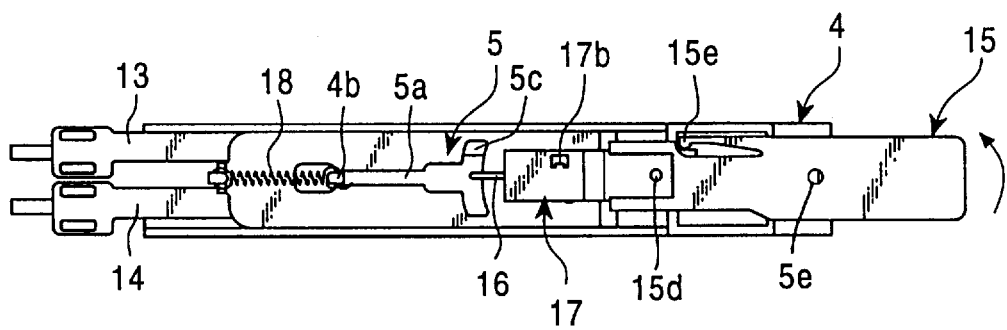
FIG. 14A shows a top plan view of the push rod in an extended position in the IC card connector device in accordance with the invention.
Figure 14B:
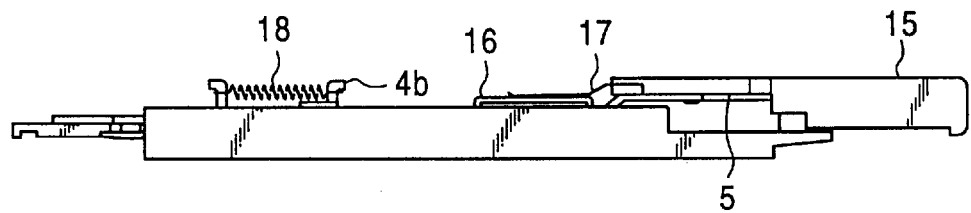
FIG. 14B shows a front view of the push rod in the extended position in the IC card connector device in accordance with the invention.
Figure 15:
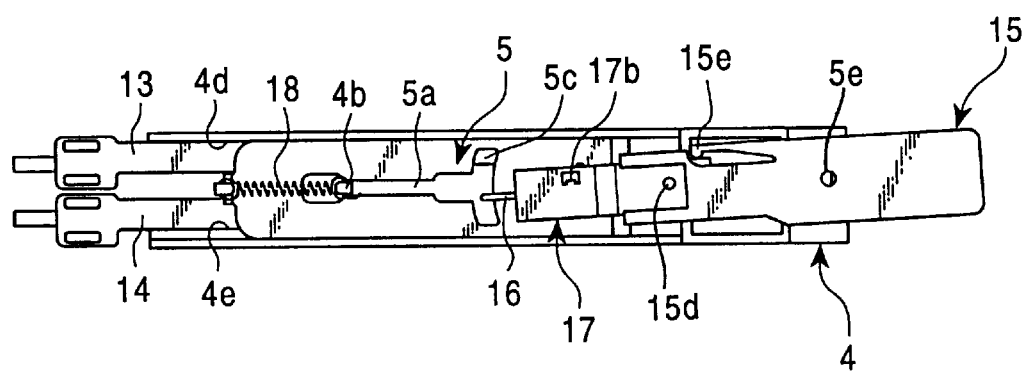
FIG. 15 is a schematic representation illustrative of a state wherein the handle has been operated with the push rod in the extended position in the IC card connector device in accordance with the invention.
Figure 16A:
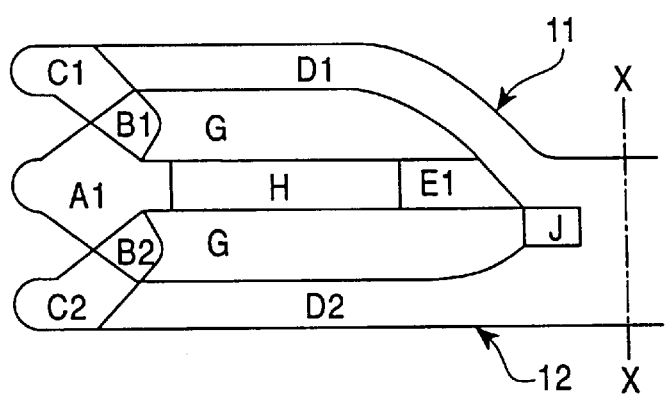
FIG. 16A shows a top plan view of a heart-shaped cam cutout serving as a locking mechanism in the IC card connector device in accordance with the invention.
Figure 16B:
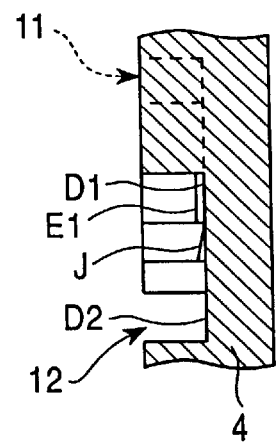
FIG. 16B shows a sectional view of the heart-shaped cam cutout serving as the locking mechanism in the IC card connector device taken at the line X—X of FIG. 16A.
Figure 17:
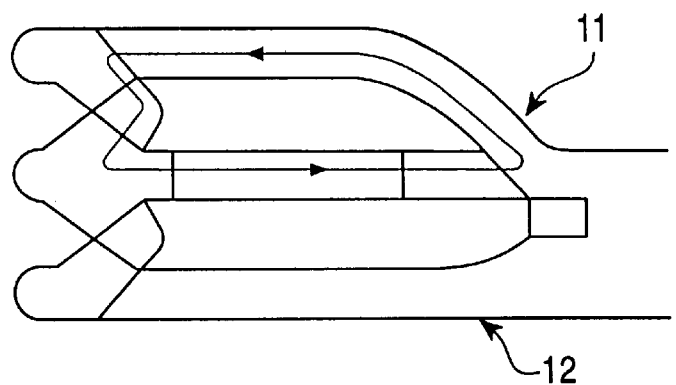
FIG. 17 is a schematic representation illustrative of a transmitting pin tracing a first heart-shaped cam cutout, which serves as a locking mechanism, in the IC card connector device in accordance with the invention.
Figure 18:
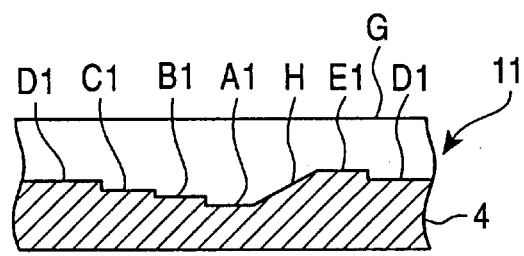
FIG. 18 is a schematic representation illustrative of the heights of all cam surfaces of the first heart-shaped cam cutout, which serves as the locking mechanism, in the IC card connector device in accordance with the invention.
Figure 19:
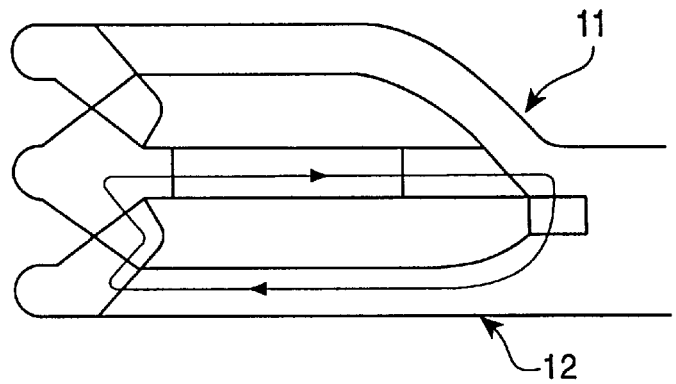
FIG. 19 is a schematic representation illustrative of a transmitting pin tracing a second heart-shaped cam cutout, which serves as the locking mechanism, in the IC card connector device in accordance with the invention.
Figure 20:
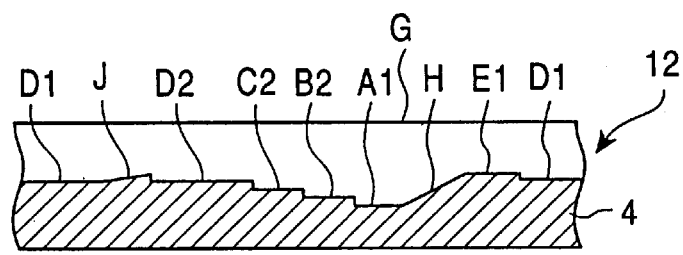
FIG. 20 is a schematic representation illustrative of the heights of all cam surfaces of the second heart-shaped cam cutout, which serves as the locking mechanism, in the IC card connector device in accordance with the invention.

An embodiment of a connector device for an IC card in accordance with the invention will be described in conjunction with FIG. 1 through FIG. 22. FIG. 1 is a top plan view of an IC card connector device in accordance with the invention in a state where an IC card has been inserted therein; FIG. 2 is a top plan view of the IC card connector device in accordance with the invention in a state wherein the IC card has been inserted therein and a push rod is in an extended position; FIG. 3 is a top plan view of the IC card connector device in accordance with the invention in a state immediately after the IC card has been ejected therefrom; and FIG. 4 is an exploded view of an essential section of an ejection mechanism of the IC card connector device in accordance with the invention. FIG. 5 shows a frame of the IC card connector device in accordance with the invention, wherein FIG. 5A is a top plan view of the frame, FIG. 5B is a front view thereof, FIG. 5C is a bottom view thereof, and FIG. 5D is a right side view thereof. FIG. 6 shows a push rod of the IC card connector device in accordance with the invention, wherein FIG. 6A is a top plan view of the push rod and FIG. 6B is a front view thereof. FIG. 7 shows a driving plate of the IC card connector device in accordance with the invention, wherein FIG. 7A is a top plan view of the driving plate, and FIG. 7B is a front view thereof. FIG. 8 shows an elastic member of the IC card connector device in accordance with the invention, wherein FIG. 8A is a top plan view of the elastic member, and FIG. 8B is a front view thereof. FIG. 9 shows a handle of the IC card connector device in accordance with the invention, wherein FIG. 9A is a top plan view of the handle, FIG. 9B is a front view thereof, FIG. 9C is a bottom view thereof, FIG. 9D is a left side view thereof, FIG. 9E is a sectional view taken at the line 9E—9E, and FIG. 9F is a sectional view taken at the line 9F—9F. FIG. 10 is a sectional view showing an essential section of an ejection mechanism of the IC card connector device in accordance with the invention. FIG. 11 shows schematic representations illustrative of the push rod and the handle in their original conditions in the IC card connector device in accordance with the invention, wherein FIG. 11A is an enlarged sectional top plan view of an essential section, and FIG. 11B is an enlarged sectional front view of the essential section. FIG. 12 shows schematic representations illustrative of the push rod and the handle in operation in the IC card connector device in accordance with the invention, wherein FIG. 12A is an enlarged sectional top plan view of an essential section, and FIG. 12B is an enlarged sectional front view of the essential section. FIG. 13 shows schematic representations illustrative of the push rod in a pushed-in position in the IC card connector device in accordance with the invention, wherein FIG. 13A is a top plan view of the push rod in the pushed-in position, and FIG. 13B is a front view thereof. FIG. 14 shows schematic representations illustrative of the push rod in an extended position in the IC card connector device in accordance with the invention, wherein FIG. 14A is a top plan view of the push rod in the extended position, and FIG. 14B is a front view thereof. FIG. 15 is a schematic representation illustrative of a state wherein the handle has been operated with the push rod in the extended position in the IC card connector device in accordance with the invention. FIG. 16 shows schematic representations illustrative of a heart-shaped cam cutout serving as a locking mechanism in the IC card connector device in accordance with the invention, wherein FIG. 16A is a top plan view of the heart-shaped cam cutout, and FIG. 16B is a sectional view of an essential section of the heart-shaped cam cutout taken at the line X—X of FIG. 16A. FIG. 17 is a schematic representation illustrative of a transmitting pin tracing a first heart-shaped cam cutout, which serves as a locking mechanism, in the IC card connector device in accordance with the invention. FIG. 18 is a schematic representation illustrative of the heights of all cam surfaces of the first heart-shaped cam cutout, which serves as the locking mechanism, in the IC card connector device in accordance with the invention. FIG. 19 is a schematic representation illustrative of a transmitting pin tracing a second heart-shaped cam cutout, which serves as the locking mechanism, in the IC card connector device in accordance with the invention. FIG. 20 is a schematic representation illustrative of the heights of all cam surfaces of the second heart-shaped cam cutout, which serves as the locking mechanism, in the IC card connector device in accordance with the invention. FIG. 21 is a schematic representation illustrative of how a first IC card is ejected from the IC card connector device in accordance with the invention. FIG. 22 is a schematic representation illustrative of how a second IC card is ejected from the IC card connector device in accordance with the invention.

As shown in FIG. 1 through FIG. 22, the IC card connector device in accordance with the invention is formed primarily of: multiple pin contacts 2 for the connection to socket contacts, not shown, in an IC card 1; a pin housing 3 which is press-fitted in a predetermined orientation and fixed; a pair of frames 4 which are secured to the pin housing 3 and which guide the IC card 1 on both sides widthwise at the time of inserting or removing the IC card 1; a push rod 5 movably attached to one frame 4; an ejection arm 6 rotatably supported by the pin housing 3; and first and second swing arms 7 and 8 rotatably supported by the pin housing 3. An ejection mechanism, which will be described later, is provided between the push rod 5 and the ejection arm 6.

As shown in FIG. 1 through FIG. 3, the pin housing 3 is provided with a first support shaft 9 and a second support shaft 10 disposed with a predetermined interval therebetween. One end of the ejection arm 6 is rotatably supported by the first support shaft 9.

The ejection arm 6 has a connecting hole 6a and an engaging portion 6b, the engaging portion 6b extending out of the pin housing 3.

The first swing arm 7 is also rotatably supported by the first support shaft 9; it has a jaw 7a for pushing the IC card 1 out, and a tongue 7b that juts out into the connecting hole 6a of the ejection arm 6.

The second swing arm 8 is rotatably supported by the second support shaft 10; it has a jaw 8a for pushing the IC card 1 out, and a tongue 8b that juts out into the connecting hole 6a of the ejection arm 6.

The configuration of the ejection mechanism will now be described. The IC card connector device according to the embodiment permits two IC cards 1 to be inserted and removed along two guide grooves 4a1, 4a2 formed in the inner surfaces of the pair of frames 4, and it is equipped with a single push rod 5 for ejecting the two IC cards 1, the push rod 5 being located on the outer surface of one of the frames 4.

As shown in FIG. 4, FIG. 5, and FIG. 16 through FIG. 20, a pair of guide protuberances 4b and 4c are provided on the outer surface of the frame 4, and first and second heart-shaped cam cutouts 11 and 12, respectively, that constitute locking mechanisms are formed between the guide protuberances 4b and 4c.

The first heart-shaped cam cutout 11 and the second heart-shaped cam cutout 12 are provided side by side and share a part of a cam cutout adjacent to both. More specifically, the first and second heart-shaped cam cutouts 11 and 12 have cam surfaces of different heights, and these two cam cutouts share a part of each of cam surfaces A1, H, E1, and a cam surface D1. A slant cam surface J that gradually grows higher toward the cam surface D2 is provided between the cam surface D1 and the cam surface D2 so as to connect the first and second heart-shaped cam cutouts 11 and 12.

Two, namely, first and second, driving plates 13 and 14 are held on the outer surface of the frame 4 in such a manner that they are able to reciprocate. As shown in FIG. 7, the first and second driving plates 13 and 14 have identical configurations; they have receiving portions 13a and 14a, and engaging slots 13b and 14b. To install the first driving plate 13 and the second driving plate 14 on the frame 4, one of them is reversed so that they are symmetrical as illustrated in FIG. 21 and FIG. 22.

In the first driving plate 13, the receiving portion 13a is positioned on the first heart-shaped cam cutout 11 and it is held in a guide recess 4d of the frame 4 such that it is free to reciprocate. In the second driving plate 14, the receiving portion 14a is positioned on the second heart-shaped cam cutout 12 and it is held in a guide recess 4e of the frame 4 such that it is free to reciprocate.

The engaging portions 6b of the ejection arms 6 provided at top and bottom are engaged with the engaging slot 13b of the first driving plate 13 and the engaging slot 14b of the second driving plate 14.

The single push rod 5 is attached to the outer surface of the frame 4 from above the first and second driving plates 13 and 14. The push rod 5 is held by the guide protuberance 4b of the frame 4 such that it may reciprocate in the direction in which the IC card 1 is inserted or removed.

A handle 15 shown in FIGS. 9, 11, and 12 is attached to one end of the push rod 5. The handle 15 composed of a synthetic resin molding has top and bottom openings 15a and 15b, a fitting hole 15c formed from the top wall down through the top opening 15a, a protuberance 15d provided on the bottom surface, and a spring member 15e provided integrally with a side portion of the handle 15.

The distal end of the push rod 5 is fitted in the engaging opening 15a, which has a wide opening, of the handle 15. As illustrated in FIGS. 11 and 12, the protuberance 5e provided in the vicinity of the distal end of the push rod 5 is fitted and locked in the fitting hole 15c. Thus, the push rod 5 and the handle 15 are connected, and the handle 15 circularly moves using the protuberance 5e as a rotation shaft.

When the handle 15 has been attached to the push rod 5, a part of the spring member 15e of the handle 15 is abutted against the side of the push rod 5 as illustrated in FIGS. 13 through 15 so as to reset the handle 15 to its original condition. After the handle 15 circularly moves, the spring member 15e sets the handle 15 back to its original condition.

The guide protuberance 4c of the frame 4 is loosely fitted in the opening 15b of the handle 15 as shown in FIGS. 11 and 12, and the guide protuberance 4c guides the handle 15 which moves in the direction in which the IC card 1 is inserted or removed.

As shown in FIG. 6, the push rod 5 is provided with a guide slot 5a. The guide protuberance 4b of the frame 4 is inserted in the guide slot 5a.

The push rod 5 further has a shaft hole 5b, a relief hole 5c, and a protuberance 5d formed between the shaft hole 5b and the relief hole 5c.

A single transmitting pin 16 having a U-shape is held on the outer surface of the push rod 5.

The transmitting pin 16 has a top segment portion 16a and bent segment portions 16b and 16c which are formed on both ends of the top segment portion 16a and which have the same length. The bent segment portion 16b is inserted in the shaft hole 5b, while the bent segment portion 16c is inserted in the relief hole 5c and can be selectively engaged with the cam surfaces of the first and second heart-shaped cam cutouts 11 and 12. When the transmitting pin 16 moves along with the push rod 5, the bent segment portion 16c of the transmitting pin 16 can be engaged with or disengaged from the first and second driving plates 13 and 14.

The transmitting pin 16 can be swung around the shaft hole 5b. The top segment portion 16a is abutted against the protuberance 5d of the push rod 5, and the bent segment portion 16c of the transmitting pin 16 can be moved up or down according to the heights of the respective cam surfaces by using the protuberance 5d as a supporting point. The transmitting pin 16 swings on the protuberance 5d, so that the frictional resistance between the push rod 5 and the transmitting pin 16 is low, enabling smooth movement of the transmitting pin 16.

The handle 15 is provided with an elastic member 17 composed of a leaf spring as shown in FIG. 8. The elastic member 17 has a hole 17a and a lug 17b provided on a side thereof.

With the elastic member 17 held in the opening of the handle 15, the protuberance 15d of the handle 15 is fitted in the hole 17a so that the elastic member 17 circularly moves together with the handle 15. The lug 17b of the elastic member 17 can be engaged with or disengaged from the transmitting pin 16 as illustrated in FIGS. 13 through 15. When the handle 15 is circularly moved, the lug 17b hooks the transmitting pin 16 to move the bent segment portion 16c from the first heart-shaped cam cutout 11 to the second heart-shaped cam cutout 12, using the bent segment portion 16b of the transmitting pin 16 as the rotation shaft.

Further, as shown in FIG. 10, the elastic member 17 elastically presses the top segment portion 16a of the transmitting pin 16 between the bent segment portion 16c of the transmitting pin 16 and the protuberance 5d of the push rod 5 to cause the bent segment portion 16c to be in resilient contact with a cam surface and also to cause the transmitting pin 16 to incline so as to move the bent segment portion 16b away from the cam surface.

The elastic member 17 may be attached to the push rod 5 although it is not shown. The transmitting pin 16 may alternatively be turned directly by the handle 15.

A coil spring 18 is extended between the guide protuberance 4b of the frame 4 and the push rod 5. The push rod 5 is urged by the coil spring 18 so as to project from the front of the frame 4.

When the push rod 5 is pushed in, the bent segment portion 16c of the transmitting pin 16 traces the respective cam surfaces of the first heart-shaped cam cutout 11 in the directions indicated by the solid lines with arrows in FIG. 17. When the bent segment portion 16c is locked on a cam surface B1, the push rod 5 is held in the pushed-in position shown in FIGS. 1 and 13. When the bent segment portion 16c moves from a cam surface E1 to a cam surface D1 and the movement of the push rod 5 stops, the push rod 5 is retained in the extended position as shown in FIGS. 2 and 14.

Further, as the push rod 5 is pushed in, the bent segment portion 16c of the transmitting pin 16 traces the respective cam surfaces of the second heart-shaped cam cutout 12 in the directions indicated by the solid lines with arrows in FIG. 19. When the bent segment portion 16c is locked on a cam surface B2, the push rod 5 is held in the pushed-in position shown in FIGS. 1 and 13. When the bent segment portion 16c moves from a cam surface E1 to a cam surface D1, which are shared, and the movement of the push rod 5 stops, the push rod 5 is retained in the extended position as shown in FIGS. 2 and 14.

When the handle 15 in the extended position is circularly moved against the springiness of the spring member 15e, the handle 15 circularly moves with the elastic member 17, using the protuberance 5e as its rotation shaft as illustrated in FIG. 15, so that the lug 17b of the elastic member 17 hooks the transmitting pin 16 and moves the bent segment portion 16c. As a result, the bent segment portion 16c of the transmitting pin 16 shifts from the cam surface D1 over the slant cam surface J to a cam surface D2. Under this condition, when the push rod 5 is pushed in, the bent segment portion 16c moves from the cam surface D2 to a cam surface C2. When the pushing is stopped, the push rod 5 is slightly pushed back by the coil spring 18, and the bent segment portion 16c is placed in the pushed-in position, being locked on the cam surface B2.

As soon as the handle 15 which has been circularly moved is released, the handle 15 is set back in unison with the elastic member 17 to its original condition by the spring member 15e.

Thus, the transmitting pin 16 selectively traces the first and second heart-shaped cam cutouts 11 and 12, and the bent segment portion 16c of the transmitting pin 16 moves from the first heart-shaped cam cutout 11 to the second heart-shaped cam cutout 12 as the handle 15 is circularly moved.

Regarding the IC card connector device having the configuration set forth above, a description will be given first to a normal operation mode wherein the first IC card 1 at the top is inserted and then ejected primarily with reference to FIGS. 16, 17, 18, and 21.

First, the push rod 5 is retained in the pushed-in position shown in FIGS. 1 and 13 when the first and/or second IC card 1 has not been inserted.

Figure 21A:
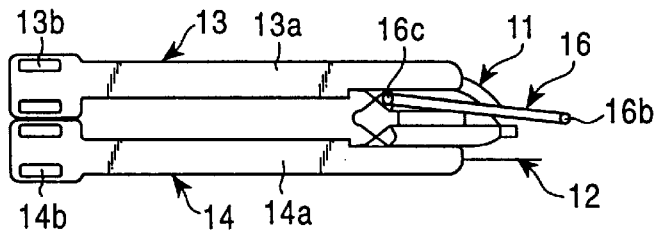
FIGS. 21A through 21G are schematic representations illustrating how a first IC card is ejected from the IC card connector device in accordance with the invention.

In this case, as shown in FIG. 21A, the bent segment portion 16c of the transmitting pin 16 is locked on the cam surface B1 of the first heart-shaped cam cutout 11, and the push rod 5 is securely retained in the pushed-in position by the tensile force of the coil spring 18 and the transmitting pin 16 locked on the cam surface B1.

Under the condition described above, as the first IC card 1 is inserted along the guide groove 4a1 of the frame 4, the first IC card 1 moving toward the pin housing 3 pressfits the pin contacts 2 of the pin housing 3 into its socket contacts while pushing the jaws 7a and 8a of the first and second swing arms 7 and 8, respectively. Hence, inserting the IC card 1 to a predetermined depth completes the insertion in which the IC card 1 is securely connected to all pin contacts 2.

At this time, the first and second swing arms 7 and 8 swing in the opposite directions from each other, using the first support shaft 9 and the second support shaft 10 as their rotation shafts. The swinging motions of these swing arms 7 and 8 are transmitted to the ejection arm 6 through the connecting portion of the tongues 7b, 8b and the connecting hole 6a. This causes the ejection arm 6 to circularly move using the first support shaft 9 as its rotation shaft, thereby moving the first driving plate 13 toward the front of the frame 4.

Figure 21B:
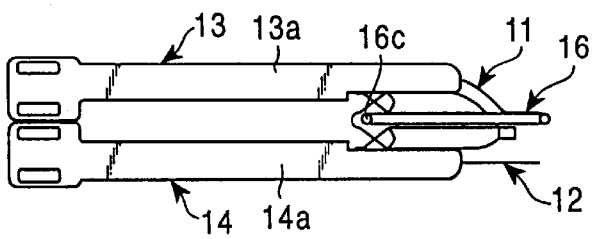
Figure 21C:
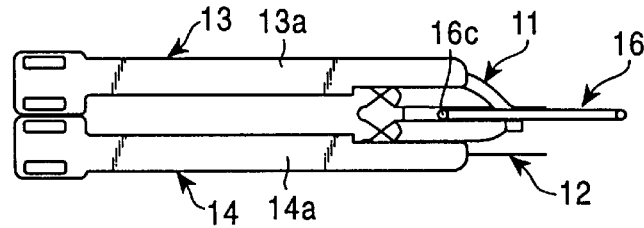
Figure 21D:
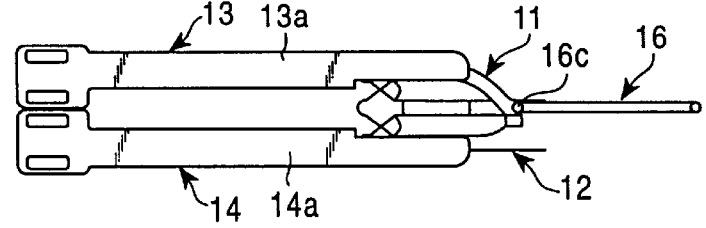
Figure 21E:
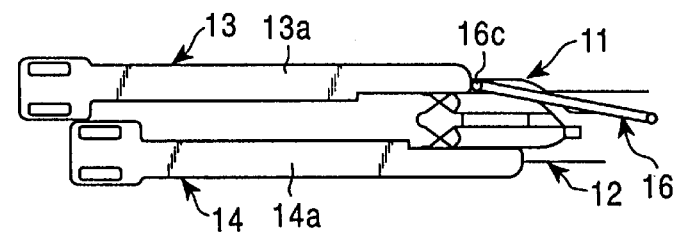
Figure 21F:
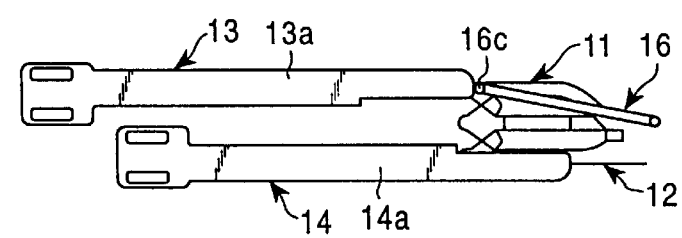
Figure 21G:
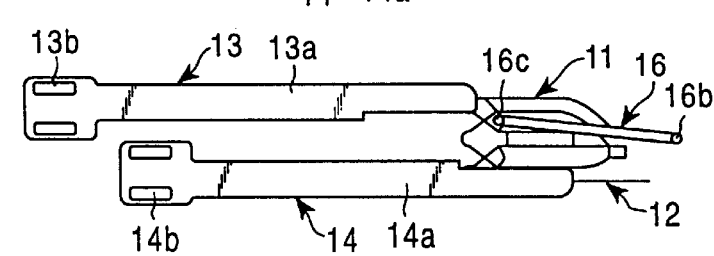

Thus, the receiving portion 13b of the first driving plate 13 moves from the cam surface C1 to the cam surface D1 of the first heart-shaped cam cutout 11 as illustrated in FIGS. 21G and 21A. The bent segment portion 16c of the transmitting pin 16 is locked on the cam surface B1 away from the cam surface D1, so that the transmitting pin 16 retains the above condition; therefore, the push rod 5 is maintained in the pushed-in position while the first IC card 1 is in connection.

When the second IC card 1 is inserted along the guide groove 4a2 of the frame 4, the second IC card 1 moving toward the pin housing 3 provided at bottom press-fits the pin contacts 2 of the pin housing 3 into its socket contacts while pushing the jaws 7a and 8a of the first and second swing arms 7 and 8, respectively, which are provided at bottom. Hence, inserting the second IC card 1 to a predetermined depth completes the insertion in which the second IC card 1 is securely connected to all pin contacts 2 as described above.

At this time, the first and second swing arms 7 and 8 swing in the opposite directions from each other, using the first support shaft 9 and the second support shaft 10 as their rotation shafts. The swinging motions of these swing arms 7 and 8 are transmitted to the ejection arm 6 through the connecting portion of the tongues 7b, 8b and the connecting hole 6a. This causes the ejection arm 6 to circularly move using the first support shaft 9 as its rotation shaft, thereby moving the second driving plate 14 toward the front of the frame 4.

Figure 22A:
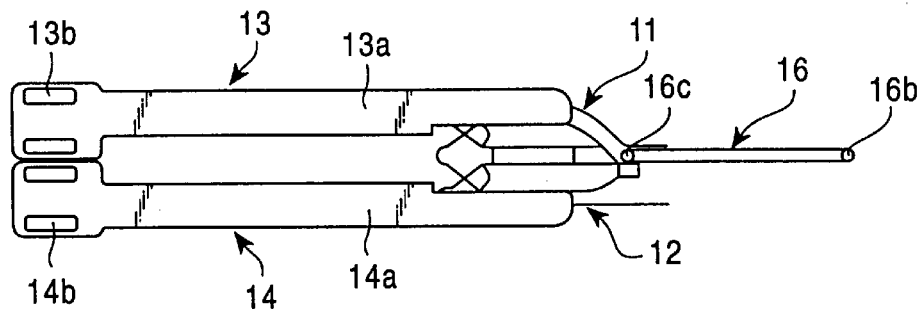
FIGS. 22A through 22D show schematic representations illustrating how a second IC card is ejected from the IC card connector device in accordance with the invention.
Figure 22B:
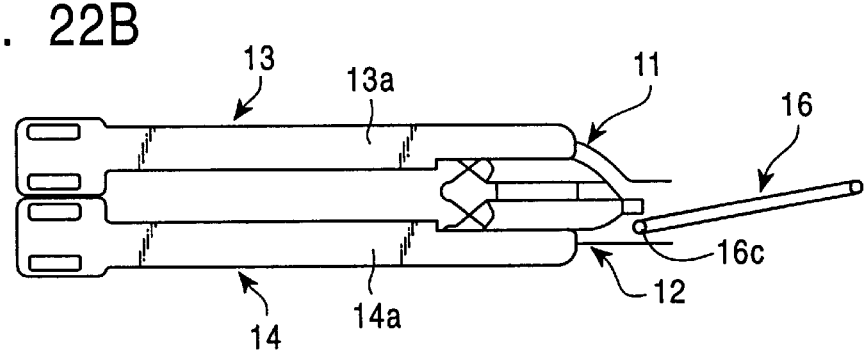
Figure 22C:
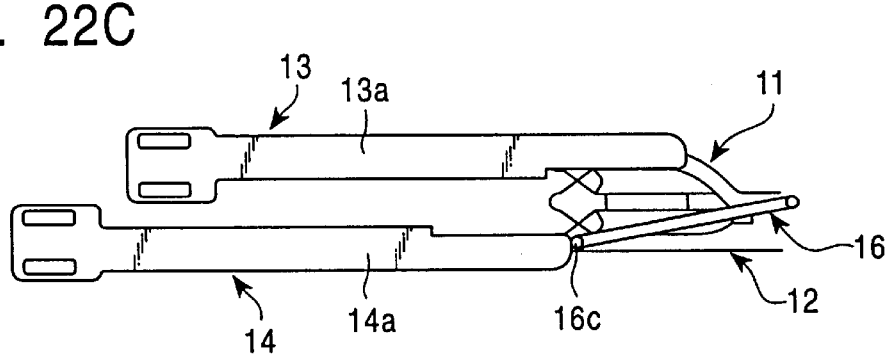
Figure 22D:
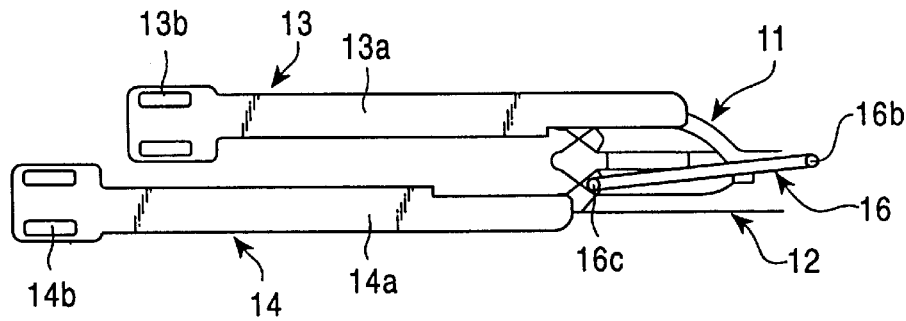
Figure 23:
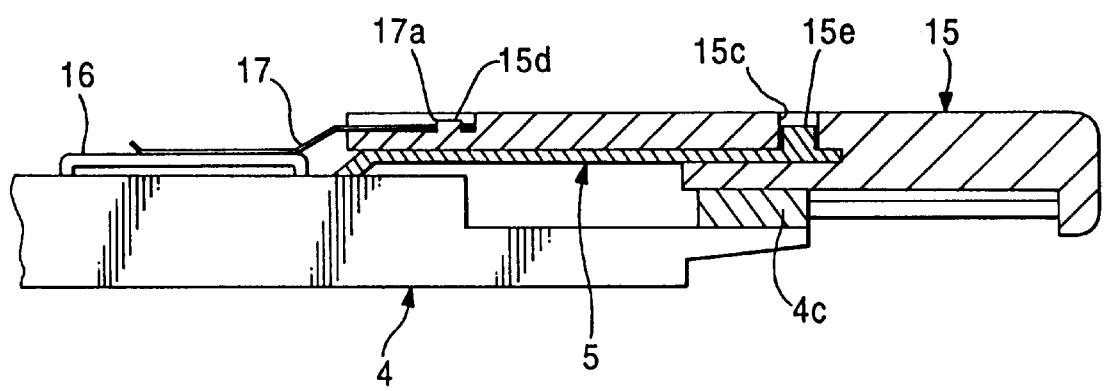
FIG. 23 shows a schematic illustration of how a resilient piece attaches to the handle in the IC card connector device.

Thus, the receiving portion 14a of the second driving plate 14 moves from the cam surface C2 to the cam surface D2 of the second heart-shaped cam cutout 12 to complete the insertion of the second IC card 1 as illustrated in FIG. 22D and FIG. 22A.

To eject the first IC card 1 from the state illustrated in FIG. 21A, the push rod 5, which has been retained in the pushed-in position, is first pushed in forward, that is, the push rod 5 is pressed, to jut out the handle 15 of the push rod 5 to the extended position as shown in FIGS. 2 and 14.

In this case, as the push rod 5, which has been held in the pushed-in position, is pushed, the bent segment portion 16c of the transmitting pin 16 moves from the cam surface B1 to the cam surface A1 of the first heart-shaped cam cutout 11 as illustrated in FIG. 21B. In this state, when pushing the push rod 5 is stopped, the tensile force of the coil spring 18 causes the bent segment portion 16c to move from the cam surface A1 to the cam surface D1 via the cam surfaces H and E1.

At this time, since the cam surface A1 is lower than the cam surface B1, the bent segment portion 16c does not move back to the cam surface B1.

Thus, the bent segment portion 16c shifts from the state shown in FIG. 21B to the state shown in FIG. 21D via the state shown in FIG. 21C. As illustrated in FIG. 21D, the bent segment portion 16c of the transmitting pin 16 becomes engageable with the receiving portion 13b of the first driving plate 13 within the cam surface D1.

When the push rod 5 is jutted out to the extended position and then the handle 15 of the push rod 5 is pressed toward the pushed-in position, the bent segment portion 16c of the transmitting pin 16 moves from the cam surface D1 to the cam surface C1 of the first heart-shaped cam cutout 11 as shown in FIGS. 21E and 21F. At the same time, the bent segment portion 16c presses the receiving portion 13b of the first driving plate 13, causing the ejection arm 6 engaged with the first driving plate 13 to turn.

As the ejection arm 6 turns, the jaws 7a and 8a of the first and second swing arms 7 and 8, respectively, press both side ends of the first IC card 1 nearly straight in the ejecting direction. Thus, as shown in FIG. 3, the socket contacts of the first IC card 1 and the pin contacts 2 of the pin housing 3, which have been press-fitted, are disengaged, and the first IC card 1 can be easily ejected from the IC card connector device by holding the front end of the first IC card 1 with fingers.

At the time of pushing the push rod 5, the bent segment portion 16c does not go back to the cam surface E1 since the cam surface D1 is lower than the cam surface E1.

When pushing the push rod 5 is stopped, the coil spring 18 pushes the push rod 5 back, and the bent segment portion 16c of the transmitting pin 16 moves from the cam surface C1 to the cam surface B1 of the first heart-shaped cam cutout 11, placing the bent segment portion 16c in the pushed-in position where it is locked on the cam surface B1 as shown in FIG. 21G.

At this time, since the cam surface C1 is lower than the cam surface D1, the bent segment portion 16c does not move back to the cam surface D1.

The procedure for ejecting the second IC card 1, which has been inserted as set forth above, will now be described primarily in conjunction with FIGS. 13, 14, 15, 21, and 22. FIG. 21A shows a state wherein the push rod 5 is being held in the pushed-in position after the second IC card 1 has been inserted. In this state, to eject the second IC card 1, the push rod 5 is pressed to jut it out to the extended position as shown in FIG. 22A and FIG. 14. At this time, the bent segment portion 16c of the transmitting pin 16 stops within the cam surface D1 of the first heart-shaped cam cutout 11.

With the push rod 5 in the extended position, i.e. in the state illustrated in FIG. 14, when the handle 15 is circularly moved in the direction of arrow against the springiness of the spring member 15e, the elastic member 17 is circularly moved by the handle 15, and the lug 17b of the elastic member 17 hooks and turns the transmitting pin 16 to lead to a state illustrated in FIG. 15.

At this time, the bent segment portion 16c of the transmitting pin 16 moves over the slant cam surface J, and as shown in FIG. 22B, the bent segment portion 16c of the transmitting pin 16 moves from the cam surface D1 of the first heart-shaped cam cutout 11 to the cam surface D2 of the second heart-shaped cam cutout 12. The bent segment portion 16c thus becomes engageable with the receiving portion 14a of the second driving plate 14.

When the circular travel of the handle 15 is stopped, the handle 15 and the elastic member 17 are reset to their original positions by the spring member 15e, whereas the bent segment portion 16c is prevented from moving to the cam surface D1 by the cam surface J and it is retained on the cam surface D2 of the second heart-shaped cam cutout 12.

In the state described above, when the handle 15 of the push rod 5 is pushed toward the pushed-in position, the bent segment portion 16c of the transmitting pin 16 moves from the cam surface D2 to the cam surface C2 of the second heart-shaped cam cutout 12 as illustrated in FIG. 22C. At this time, the bent segment portion 16c presses the receiving portion 14a of the second driving plate 14, causing the ejection arm 6 engaged with the second driving plate 14 to circularly move.

As the ejection arm 6 turns, the jaws 7a and 8a of the first and second swing arms 7 and 8, respectively, press both side ends of the second IC card 1 nearly straight in the ejecting direction. Thus, as shown in FIG. 3, the socket contacts of the second IC card 1 and the pin contacts 2 of the pin housing 3, which have been press-fitted, are disengaged, and the second IC card 1 can be easily ejected from the IC card connector device by holding the front end of the second IC card 1 with fingers.

When pushing the push rod 5 is stopped, the bent segment portion 16c of the transmitting pin 16 moves from the cam surface C2 to the cam surface B2 of the second heart-shaped cam cutout 12 as illustrated in FIG. 22D, and the push rod 5 is locked in the pushed-in position as shown in FIG. 1.

At this time, the bent segment portion 16c does not go back to the cam surface D2 since the cam surface C2 is lower than the cam surface D2.

The procedure for ejecting the first IC card 1 in the state shown in FIG. 22D will now be described. As in the same manner previously described, the push rod 5 is pushed first.

Then, the bent segment portion 16c of the transmitting pin 16 moves from the cam surface B2 of the second heart-shaped cam cutout 12 to the cam surface D1 via the cam surfaces A1, H, and E1 which are shared by both heart-shaped cam cutouts as shown in FIG. 21D and FIG. 22A.

At this time, the bent segment portion 16c does not go back to the cam surface B2 since the cam surface A1 is lower than the cam surface B2.

When the push rod 5 in the extended position is pushed, the same series of operation in the aforesaid normal operation mode illustrated in FIG. 21 is performed.

As it is obvious from the description given above, when the push rod 5 is jutted out to the extended position and pushed toward the pushed-in position, the pressing force of the push rod 5 is transmitted to the first driving plate 13 via the single transmitting pin 16 that traces the first heart-shaped cam cutout 11, thus enabling the first IC card 1 to be ejected.

To eject the second IC card 1, the handle 15 is circularly moved to move the bent segment portion 16c of the transmitting pin 16 from the first heart-shaped cam cutout 11 to the second heart-shaped cam cutout 12 with the push rod 5 placed in the extended position. Then the push rod 5 is pressed toward the pushed-in position, causing the transmitting pin 16 to trace the second heart-shaped cam cutout 12. The second driving plate 14 is moved by the transmitting pin 16 so as to permit the second IC card 1 to be ejected.

In the embodiment described above, the first and second heart-shaped cam cutouts 11 and 12 share the cam surfaces A1, H, and E1. Alternatively, however, these cam surfaces may be formed separately.

Thus, according to the invention, to eject the first IC card 1, which has been inserted, the single push rod 5 in the extended position is pushed to eject the first IC card 1 via the single transmitting pin 16. To eject the second IC card 1, the handle 15 is circularly moved with the push rod 5 in the extended position so as to move the transmitting pin 16 from the first heart-shaped cam cutout 11 to the second heart-shaped cam cutout 12. In this state, the push rod 5 is pressed toward the pushed-in position, which causes the transmitting pin 16 to circularly move to eject the second IC card 1. Therefore, the connector device employs only the single push rod 5 and the single transmitting pin 16, making it possible to provide a smaller connector device that features fewer parts, lower cost, and better assemblability.

Further, since the ejection of the IC cards 1 can be selected by circularly moving the handle 15, a connector device with better operability can be provided.

Furthermore, the first and second IC cards 1 are ejected using the first and second heart-shaped cam cutouts 11 and 12, respectively, which are arranged side by side, the single transmitting pin 16 tracing the heart-shaped cam cutouts 11 and 12, and the first and second driving plates 13 and 14 engageable with the transmitting pin 16; hence, it is possible to provide a cheaper, smaller connector device that has fewer parts, requires a smaller installation space, and features better operability.

The first and second heart-shaped cam cutouts 11 and 12 share a part of a cam surface, thus permitting a further smaller connector device to be accomplished.

Moreover, the transmitting pin 16 is locked in the first heart-shaped cam cutout 11 or the second heart-shaped cam cutout 12 when the push rod 5 is in the pushed-in position, or the transmitting pin 16 can be engaged with the first driving plate 13 when the push rod 5 is in the extended position. When the push rod 5 is pressed in the extended position, the transmitting pin 16 moves over the cam surfaces of the first heart-shaped cam cutout 11 to press the first driving plate 13 so as to eject the first IC card 1. When the handle 15 is circularly moved in the extended position, the transmitting pin 16 becomes engageable with the second driving plate 14. In this state, pressing the push rod 5 causes the transmitting pin 16 to move over the cam surfaces of the second heart-shaped cam cutout 12 to move the second driving plate 14 thereby to eject the second IC card 1. This makes it possible to provide a cheaper, smaller connector device that has a simpler construction and fewer parts, and ensures reliable ejection of IC cards.

Since the spring member 15e for resetting the handle 15 to its home position is provided, the handle 15 can be automatically reset. This enables a connector device to be provided that permits smooth pushing operation of the push rod 5.

The spring member 15e integrally provided on the handle 15 enables a cheaper connector device that permits a simpler construction, fewer parts, and higher productivity.

Further, the top segment portion 16a of the U-shaped transmitting pin 16 is abutted against the protuberance 5d of the push rod 5, and the elastic member 17 is provided to apply elastic pressure between the bent segment portion 16c of the transmitting pin 16 and the protuberance 5d, thereby enabling the transmitting pin 16 to positively trace the cam surfaces. This makes it possible to provide a connector device that ensures accurate operation of the push rod 5 and smooth travel of the transmitting pin 16.

Further, since the bent segment portions 16b and 16c of the U-shaped transmitting pin 16 have the same length, there is no need to pay attention to directivity in assembly, permitting a connector device with high productivity to be accomplished.

In addition, when the handle 15 is circularly moved, the transmitting pin 16 is moved from the first heart-shaped cam cutout 11 to the second heart-shaped cam cutout 12 via the elastic member 17, so that the elastic member 17 serves both to hold and move the transmitting pin 16, enabling a smaller, cheaper connector device with high productivity to be provided.

What is claimed is:

1. An IC card connector device comprising: a frame which supports two, namely, first and second IC cards, in such a manner that they may be inserted therein and removed therefrom; a single push rod which is able to reciprocate between a pushed-in position and an extended position; a single transmitting pin rotably attached to the push rod; and a handle rotably attached to the push rod; wherein, when the first or/and second IC cards are inserted, the push rod is placed in the pushed-in position by a locking mechanism of the transmitting pin, and a first push on the push rod in the condition releases the locking mechanism of the transmitting pin, causing the push rod to move to an extended position where a second push on the push rod causes the first IC card to be ejected by the transmitting pin; wherein the transmitting pin is circularly moved by circularly moving the handle when the push rod is in the extended position, then the transmitting pin is circularly moved by pushing the push rod thereby to eject the second IC card; and wherein the locking mechanism is formed of two, namely, first and second, heart-shaped cam cutouts arranged side by side; the single transmitting pin is circularly moved to trace the first and second heart-shaped cam cutouts; two, namely, first and second, driving plates which are removably engaged with the transmitting pin and are able to reciprocate are provided; so that when the push rod placed in the extended position is pushed, the transmitting pin, which is in a state where it can be engaged with the first driving plate, traces the first heart-shaped cam cutout so as to move the first driving plate by the transmitting pin thereby to eject the IC card via the first driving plate, and when the push rod is in the extended position, the transmitting pin is moved from the first heart-shaped cam cutout to the second heart-shaped cam cutout by circularly moving the handle, then the push rod is pushed to cause the transmitting pin, which is in a state where it can be engaged with the second driving plate, to trace the second heart-shaped cam cutout so as to move the transiting pin and the second driving plate to eject the second IC card via the second driving plate.

2. An IC card connector device according to claim 1, wherein the first and second heart-shaped cam cutouts arranged side by side are configured to share a part of a cam cutout adjacent to the first and second heart-shaped cam cutouts.

3. An IC card connector device according to claim 1, wherein: when the push rod is in the pushed-in position, the transmitting pin is in a state where it is locked in the first heart-shaped cam cutout and disengaged from the first driving plate; when the push rod in the pushed-in position is pressed, the transmitting pin moves in unison with the push rod and traces the first heart-shaped cam cutout until the transmitting pin becomes engageable with the first driving plate and the extended position is reached; in the extended position, when the transmitting pin is moved from the first heart-shaped cam cutout to the second heart-shaped cam cutout by circularly moving the handle, the transmitting pin becomes engageable with the second driving plate; under this condition, when the push rod is pushed, the transmitting pin traces the second heart-shaped cam cutout, causing the transmitting pin to be locked in the second heart-shaped cam cutout and the push rod to be placed in the pushed-in position; and when the push rod is pressed in the pushed-in position; and when the push rod is pressed in the pushed-in position, the transmitting pin moves in unison with the push rod and traces the second heart-shaped cam cutout so that the transmitting pin becomes engageable with the first driving plate and the extended position is reached.

4. An IC card connector device according to claim 1, wherein a spring member for resetting the handle to its original condition after the handle is circularly moved.

5. An IC card connector device according to claim 4, wherein the spring member is provided integrally with the handle and a part of the spring member is abutted against the push rod.

6. An IC card connector device according to claim 1, wherein the transmitting pin is composed of a U-shaped member having a top segment portion and bent segment portions formed on both ends of the top segment portion, the push rod is provided with a protuberance against which the top segment portion of the transmitting pin is abutted, one bent segment portion of the transmitting pin is engaged with the heart-shaped cam cutouts, and the top segment portion of the transmitting pin is elastically pressed between one bent segment portion of the transmitting pin and the protuberance by an elastic member.

7. An IC card connector device according to claim 6, wherein the U-shaped transmitting pin is formed such that the bent segment portions on both ends of the top segment portion have the same length.

8. An IC card connecter device according to claim 6, wherein, when the handle is circularly moved, the transmitting pin is moved from the first heart-shaped cam cutout to the second heart-shaped cam cutout via the elastic member.

* * * * *